United States Patent
Chorghe et al.

(10) Patent No.: US 11,035,489 B2
(45) Date of Patent: Jun. 15, 2021

(54) ACTUATOR ASSEMBLY WITH SPACERS

(71) Applicant: Johnson Controls Technology Company, Auburn Hills, MI (US)

(72) Inventors: Yogesh Subhash Chorghe, Pune (IN); Amol Ramdas Vetal, Pune (IN); Atul Ramdas Patil, Pune (IN); Shivchandra Venkatrao Nagime, Latur (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 141 days.

(21) Appl. No.: 16/207,332

(22) Filed: Dec. 3, 2018

(65) Prior Publication Data

US 2020/0173574 A1 Jun. 4, 2020

(51) Int. Cl.
| | | |
|---|---|---|
| *F16K 31/04* | (2006.01) | |
| *H02K 11/30* | (2016.01) | |
| *F16H 25/20* | (2006.01) | |
| *H02K 7/06* | (2006.01) | |
| *H02K 7/116* | (2006.01) | |

(52) U.S. Cl.
CPC .......... *F16K 31/047* (2013.01); *F16H 25/20* (2013.01); *H02K 7/06* (2013.01); *H02K 7/116* (2013.01); *H02K 11/30* (2016.01); *F16H 2025/2081* (2013.01)

(58) Field of Classification Search
CPC ...... F16K 31/047; F16K 31/04; F16K 31/508; F16K 31/53; H02K 11/30; H02K 7/06; H02K 7/116; F16H 25/20; F16H 2025/2081
USPC ................. 251/129.11–129.13, 291
See application file for complete search history.

(56) References Cited

U.S. PATENT DOCUMENTS

| | | | | |
|---|---|---|---|---|
| 3,104,089 A | * | 9/1963 | Seltsam ............... | B67D 1/1466 251/263 |
| 5,062,611 A | * | 11/1991 | Hatton ............... | B60H 1/00485 251/129.11 |
| 5,855,772 A | * | 1/1999 | Miller .................. | B01D 29/846 210/86 |
| 6,321,776 B1 | * | 11/2001 | Pratt ......................... | F16K 7/14 137/312 |
| 6,471,182 B1 | * | 10/2002 | McIntosh .............. | F16K 31/046 251/129.12 |
| 6,561,480 B1 | | 5/2003 | Komiya et al. | |
| 2009/0072173 A1 | | 3/2009 | Hasunuma et al. | |
| 2012/0248355 A1 | * | 10/2012 | Harada .................. | F16K 31/047 251/129.11 |

(Continued)

FOREIGN PATENT DOCUMENTS

WO WO-90/11965 A1 10/1990

OTHER PUBLICATIONS

Foreign Search Report on EP 19212807.2, dated Apr. 28, 2020, 9 pages.
Office Action on EP 19212807.2, dated Mar. 19, 2021, 6 pages.

*Primary Examiner* — John Bastianelli
(74) *Attorney, Agent, or Firm* — Foley & Lardner LLP

(57) ABSTRACT

A variety of assemblies are configured for use with an actuator. One embodiment of the present disclosure relates to an actuator that includes a housing. An output gear is disposed within the housing. An output nut is connected to the spindle such that the spindle is rotatable within the output nut to enable linear motion of the output nut. The output nut includes a connector. A spacer is selectively coupled to the connector of the output nut.

21 Claims, 9 Drawing Sheets

(56) References Cited

U.S. PATENT DOCUMENTS

2015/0159566 A1* 6/2015 Akita ................ F02D 41/1402
137/488
2016/0146159 A1 5/2016 Kimoto et al.

* cited by examiner

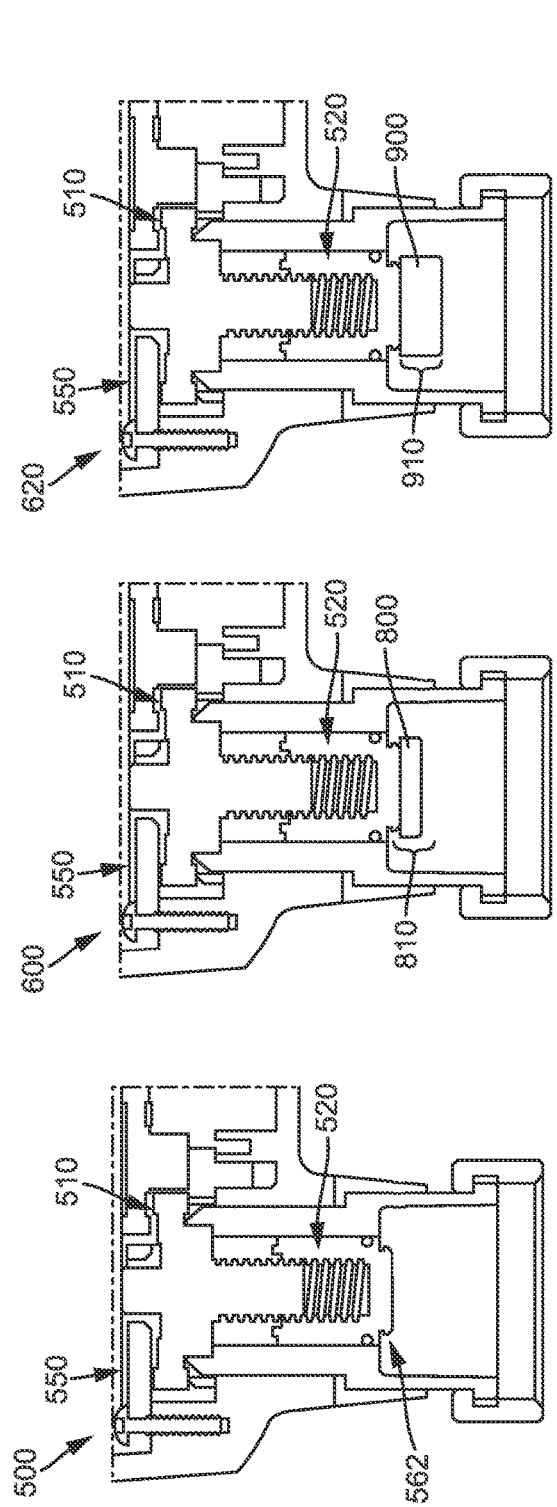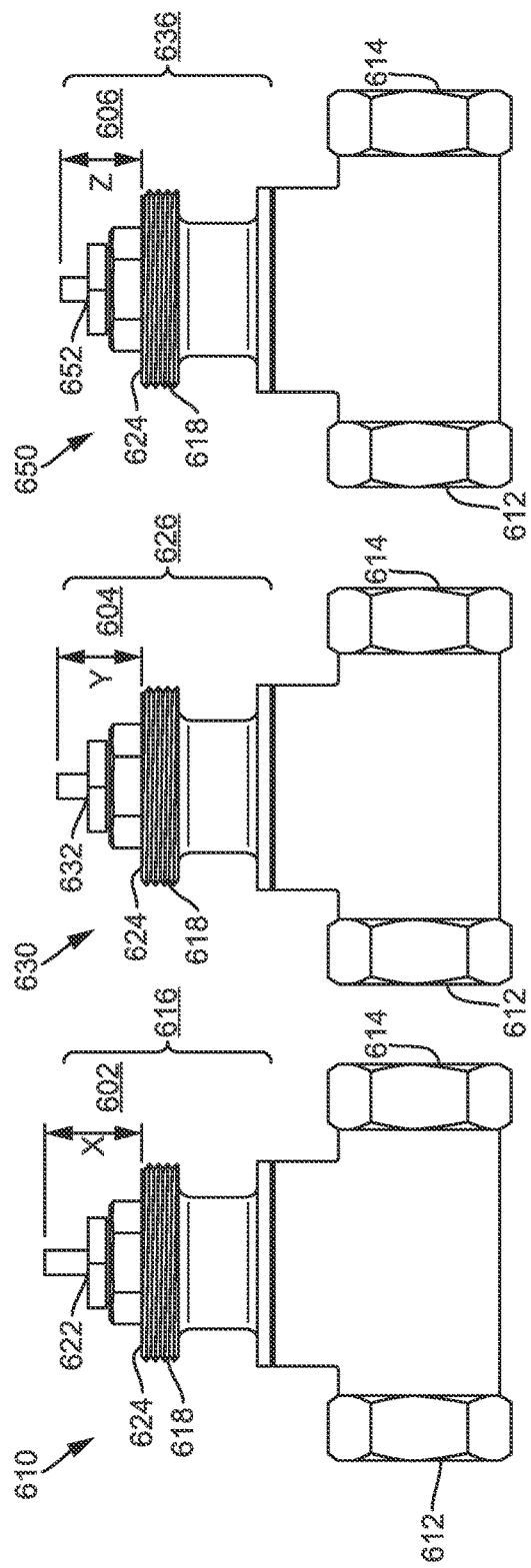
FIG. 6A   FIG. 6B   FIG. 6C

ACTUATOR ASSEMBLY WITH SPACERS

BACKGROUND

The present disclosure relates generally to actuators, and more particularly actuator assemblies that include one or more spacers to accommodate various valve configurations. Actuators are generally electrical, hydraulic, or pneumatic devices that actuate a variety of equipment by moving a movable part of that equipment between two or more positions. For example, actuators can be used to actuate a damper, a valve, a mechanical linkage or assembly, or any other type of mechanism or system. An actuator may transfer a rotation or other force to the mechanism, such as a valve, through a final output gear. The final output gear may be linked to the valve via a linkage system. Linkage systems may be required to be air-tight or water-tight to protect the inner workings of the actuator while also transferring force or torque to the valve. When the valve is properly engaged with the actuator, a rotation created by the actuator can cause a rotation of the valve between two positions, for example an open position and a closed position. The linkage system can include the output gear, a yoke or adaptor, and a stroke, spacer, bracket, or other connector. The valve assembly is operable between an open state and a closed state. In the open state, fluid flows through valve assembly at a maximum flow rate. In the closed state, fluid does not flow through valve assembly.

SUMMARY

One embodiment of the present disclosure relates to an actuator that has a housing. The housing includes a gear train, a motor, and a circuit board. The motor is operably connected to and is controlled by the circuit board. The gear train is operably connected to the motor and includes an output gear. The output nut is connected to the spindle such that the spindle is rotatable within the output nut to enable linear motion of the output nut. The output nut includes a connector. A spacer is disposed on the connector of the output nut.

In some embodiments, the connector includes a radially projection connection surface and the spacer comprises a first end and a second end, the first end comprising a plurality of flexible ribs extending away from the second end of the spacer, the plurality of flexible ribs configured to engage the radially projection connection surface In some embodiments, the plurality of flexible ribs are radially movable to snap fit with the radially projection connection surface of the connector.

In some embodiments, the spacer comprises a first end and a second end, the first end comprising a plurality of flexible ribs extending away from the second end of the spacer, the plurality of flexible ribs disposed around a circumference of the first end to form a mounting surface.

In some embodiments, a surface gap is disposed between each rib in the plurality of ribs and the mounting surface.

In some embodiments, a rib gap is disposed between each rib in the plurality of ribs and an adjacent rib in the plurality of ribs.

In some embodiments, each rib in the plurality of flexible ribs comprises a snap channel and a snap portion, the snap channel extending from the first end of the spacer axially away from the second end of the spacer, the snap portion extending radially inward from an end of the snap channel.

In some embodiments, the spacer is a first spacer, and wherein the second end of the first spacer comprises a spacer connector, the spacer connector configured to receive a second spacer, the second spacer comprising a second plurality of flexible ribs configured to engage the spacer connector.

In some embodiments, the linear motion of the output nut downward causes the spacer to move axially downward and contact the valve stem and move the valve stem linearly downward.

In some embodiments, a gear train, a motor, and circuit board, the motor operably connected to and controlled by the circuit board, and the gear train operably connected to the motor, the gear train operably connected to the output gear.

In some embodiments, the actuator further includes a valve, the actuator mounted on the valve, wherein the spacer is in contact with a valve stem of a valve. The linear motion of the output nut causes the spacer and valve stem to linearly move.

Another embodiment of the present disclosure relates to a spacer. The spacer is configured to engage an output nut that moves linearly. The spacer includes a first end and a second end disposed axially from the first end. An exterior surface is disposed between the first end and the second end. A plurality of flexible ribs extend away from the second end of the spacer, the plurality of flexible ribs configured to engage the output nut.

In some embodiments, the plurality of flexible ribs are radially flexible to snap fit with a complementary feature on the output nut.

In some embodiments, the plurality of flexible ribs disposed around a circumference of the first end to form a mounting surface.

In some embodiments, a surface gap is disposed between each rib in the plurality of ribs and the mounting surface.

In some embodiments, a rib gap is disposed between each rib in the plurality of ribs and an adjacent rib in the plurality of ribs.

In some embodiments, each rib in the plurality of flexible ribs comprises a snap channel and a snap portion, the snap channel extending from the first end of the spacer axially away from the second end of the spacer, the snap portion extending radially inward from an end of the snap channel.

In some embodiments, the spacer is a first spacer, and wherein the second end of the first spacer comprises a spacer connector, the spacer connector configured to receive a second spacer, the second spacer comprising a second plurality of flexible ribs configured to engage the spacer connector.

Another embodiment of the present disclosure relates to a method of connecting an actuator and a valve body using a spacer kit. The method includes identifying a closing dimension of the valve body, the closing dimension associated with a distance from an end of a knob to a mounting surface of the valve body. A spacer is selected from a plurality of spacers in a spacer kit that corresponds to the closing dimension, the spacer being configured to selectively couple to a connector of an output nut, the output nut connected to a spindle of the actuator, the spindle being rotatable within the output nut to enable linear motion of the output nut. The spacer includes a first end, a second end disposed axially from the first end, and a plurality of flexible ribs extending away from the second end of the spacer, the plurality of flexible ribs configured to engage the radially projection connection surface. The spacer is connected to the output nut, wherein the plurality of flexible ribs flex radially outward to engage the connector.

In some embodiments, the spindle is rotated, the rotation of the spindle causing the linear, axial movement of the output nut in the direction of the knob, wherein the second end of the spacer contacts the knob and cause the knob to move axially toward the mounting surface.

BRIEF DESCRIPTION OF THE DRAWINGS

FIG. 6A is a view of the actuator of FIG. 5 and a corresponding valve body, according to an exemplary embodiment.

FIG. 6B is a view of the actuator of FIG. 5 with a spacer and a corresponding valve body, according to an exemplary embodiment.

FIG. 6C is a view of the actuator of FIG. 5 with a spacer and a corresponding valve body, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, an actuator is shown, according to an exemplary embodiment. The actuator may be an HVAC actuator, such as a damper actuator, a valve actuator, a fan actuator, a pump actuator, or any other type of actuator that can be used in an HVAC or other system.

The aspects described herein may, increase interoperability and use of actuator and value systems by allowing for configurations that implement a wide variety of actuators and valves and do not require special tooling of the actuator and/or the valve. Beneficially, the actuator described herein includes a snapping interface on the spindle that allows for a wide variety of spacers—each having a specific axial length—to be attached to the spindle and serve different stem strokes of a linear valve body. The actuator is specifically tailored to provide an easy interface with the spacer(s) (e.g., ease of assembly) and a robust engagement that sustains the actuator load and is able to engage a specific stem stroke of the valve body. The actuator and spacer design allows for the actuator to be retro fit with the spacer without the need for special tooling or the disassembly of the actuator. The variety of spacers that can be attached to the actuator allows for the actuator to have a consistent stem length (that is extended by the addition of spacers) and eliminates the need for different spindle molds. Beneficially, this allows for a single actuator to be manufactured that can interface and engage valve bodies with a wide variety of different strokes, thereby reducing manufacturing cost and manufacturing time of the actuators.

The actuator includes a housing. The housing includes a gear train, a motor, and a circuit board. The motor is operably connected to and is controlled by the circuit board. The gear train is operably connected to the motor and includes an output gear. The output nut is connected to the spindle such that the spindle is rotatable within the output nut to enable linear motion of the output nut. The output nut includes a connector. A spacer is disposed on the connector of the output nut.

Building Management System and HVAC System

Figure 1:
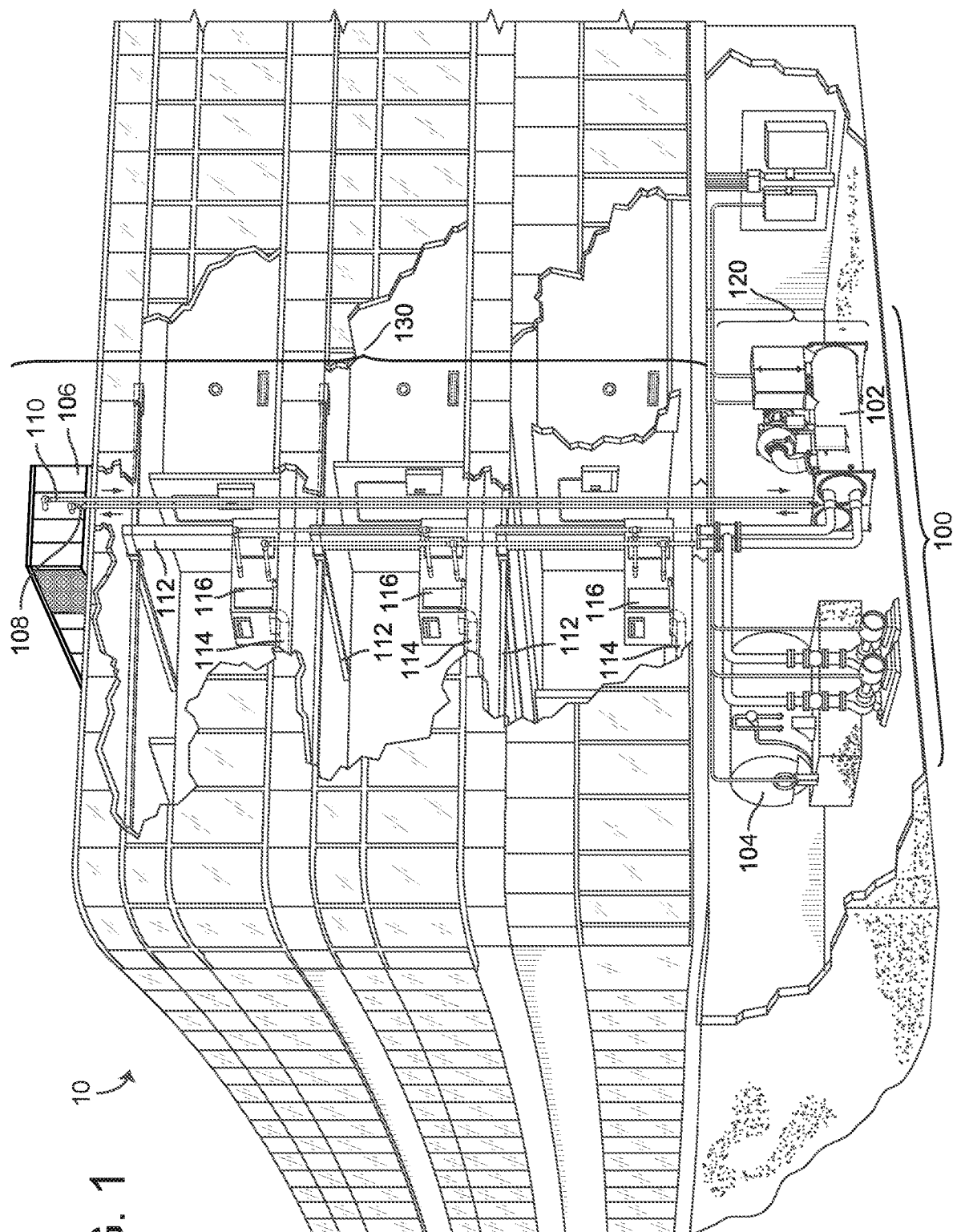
FIG. 1 is a drawing of a building equipped with a heating, ventilating, or air conditioning (HVAC) system and a building management system (BMS), according to an exemplary embodiment.

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, an HVAC system, a security system, a lighting system, a fire alerting system, and any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Figure 2:
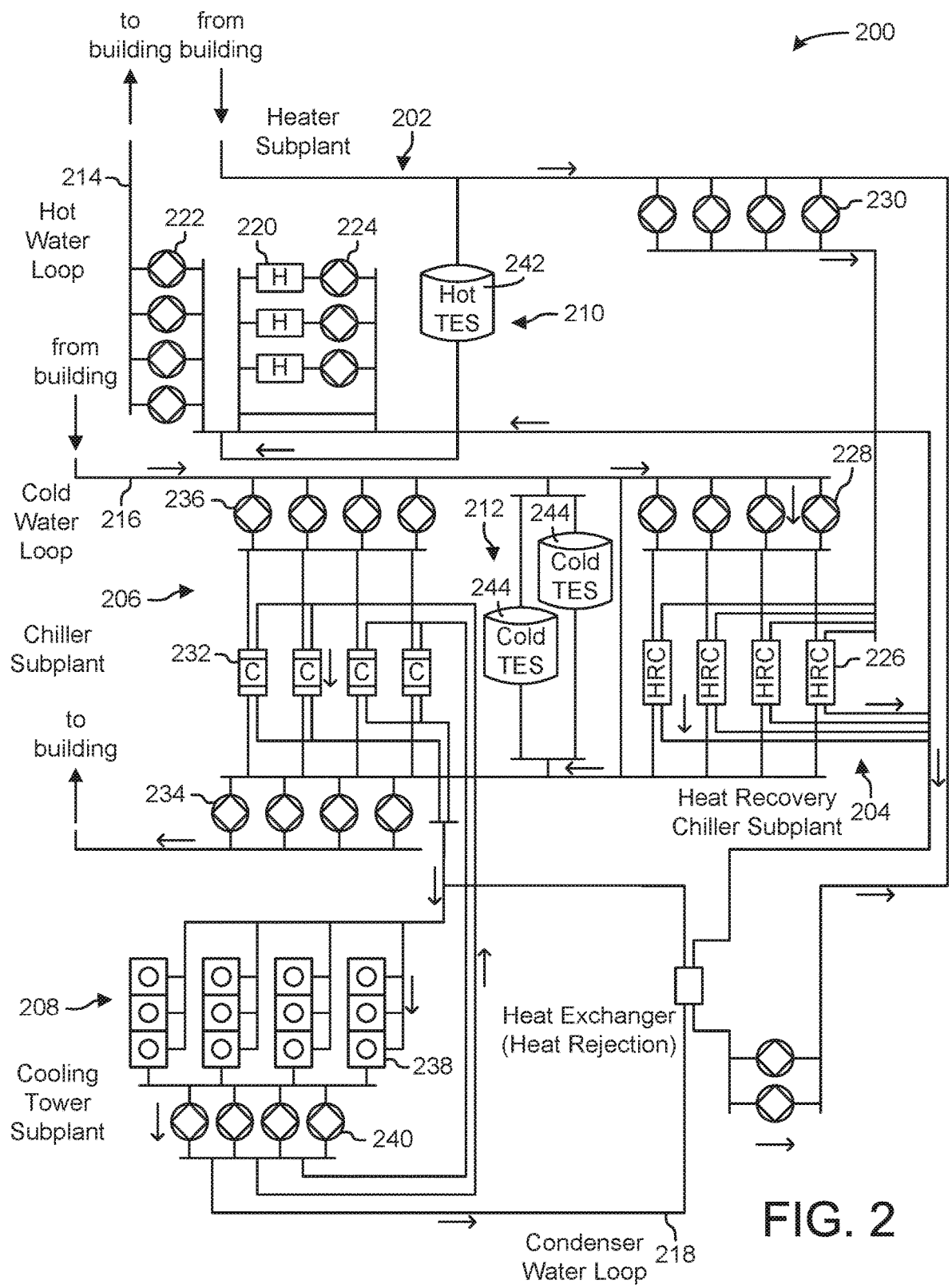
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
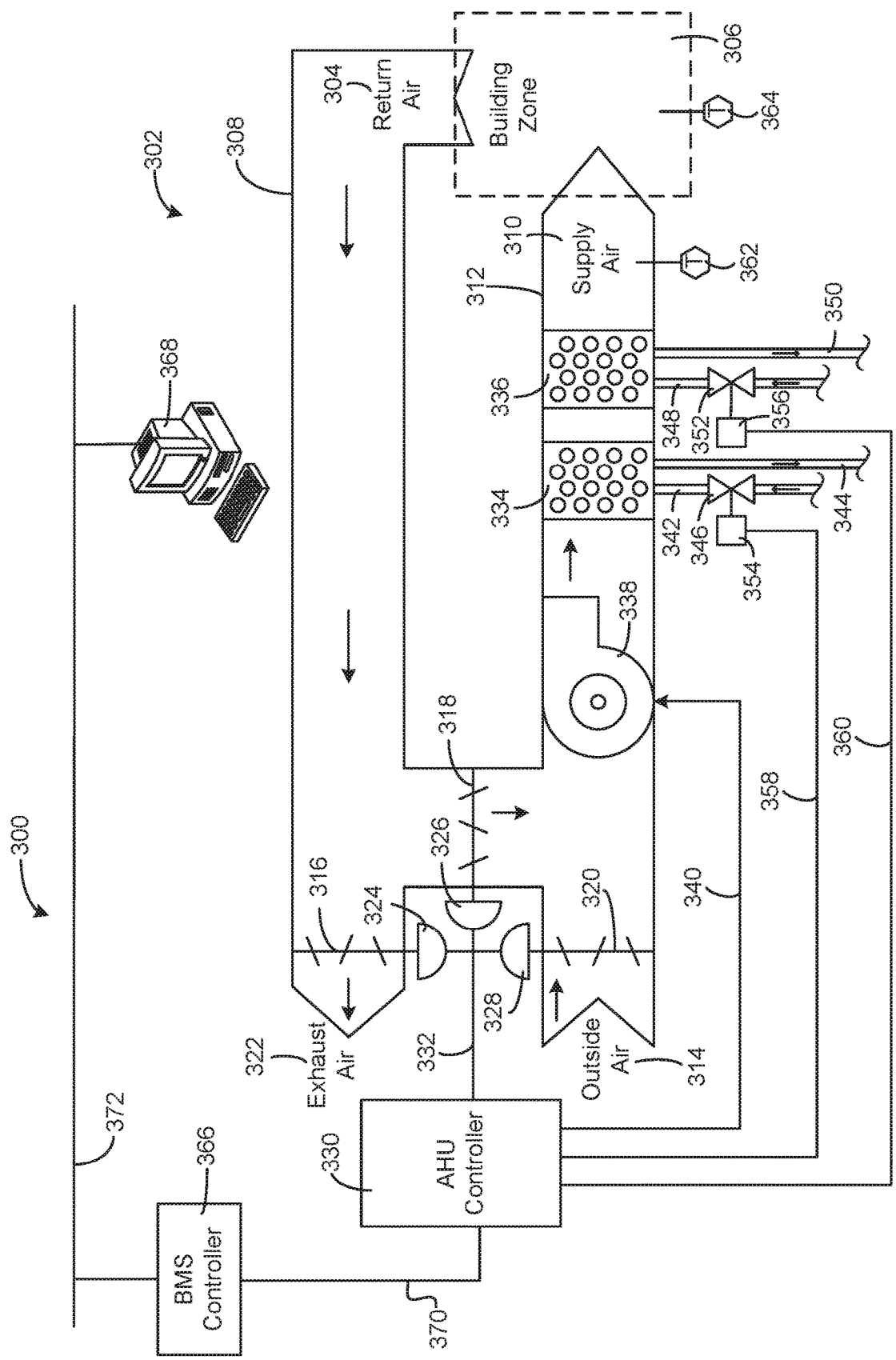
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type AHU 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a BMS controller 366 and a client device 368. BMS controller 366 may include one or more computer systems (e.g., servers, supervisory controllers, subsystem controllers, etc.) that serve as system-level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
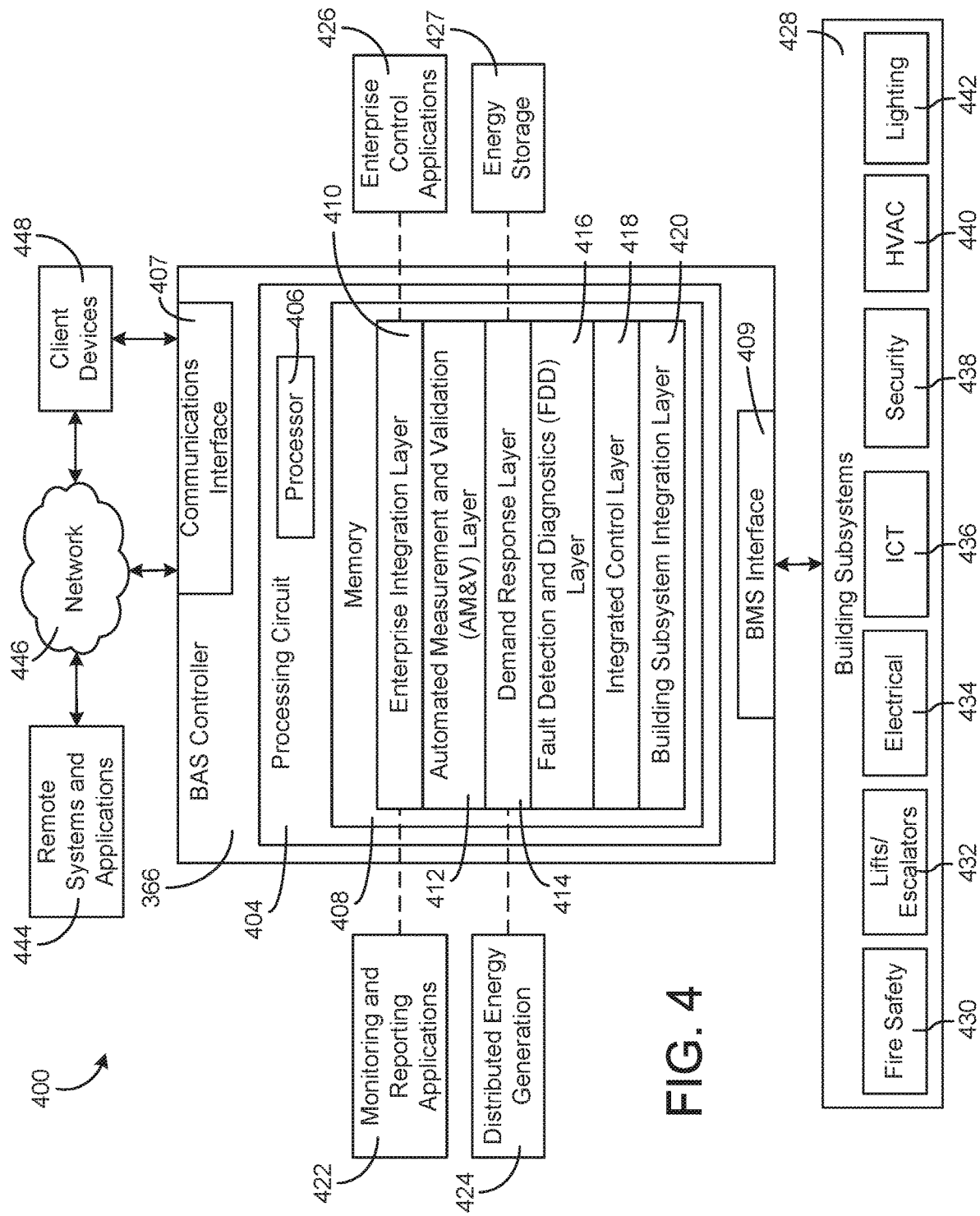
FIG. 4 is a block diagram of a BMS which may be implemented in the building of FIG. 1, according to an exemplary embodiment.

Referring now to FIG. 4, a block diagram of a BMS 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407 and 409 may be or may include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407 and 409 may be direct (e.g., local wired or wireless communications) or via a communications network 446 (e.g., a WAN, the Internet, a cellular network, etc.). For example, interfaces 407 and 409 may include an Ethernet card and port for sending and receiving data via an Ethernet-based communications link or network. In another example, interfaces 407 and 409 may include a Wi-Fi transceiver for communicating via a wireless communications network. In another example, one or both of interfaces 407 and 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407 and 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and AM&V layer 412. Integrated control layer 418 may be configured to provide calculated inputs (e.g., aggregations) to these higher levels based on outputs from more than one building subsystem.

AM&V layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

FDD layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 may be configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes may be examined by FDD layer 416 to expose when the system begins to degrade in performance and alert a user to repair the fault before it becomes more severe.

Snap Spindle for an Actuator

Figure 5:
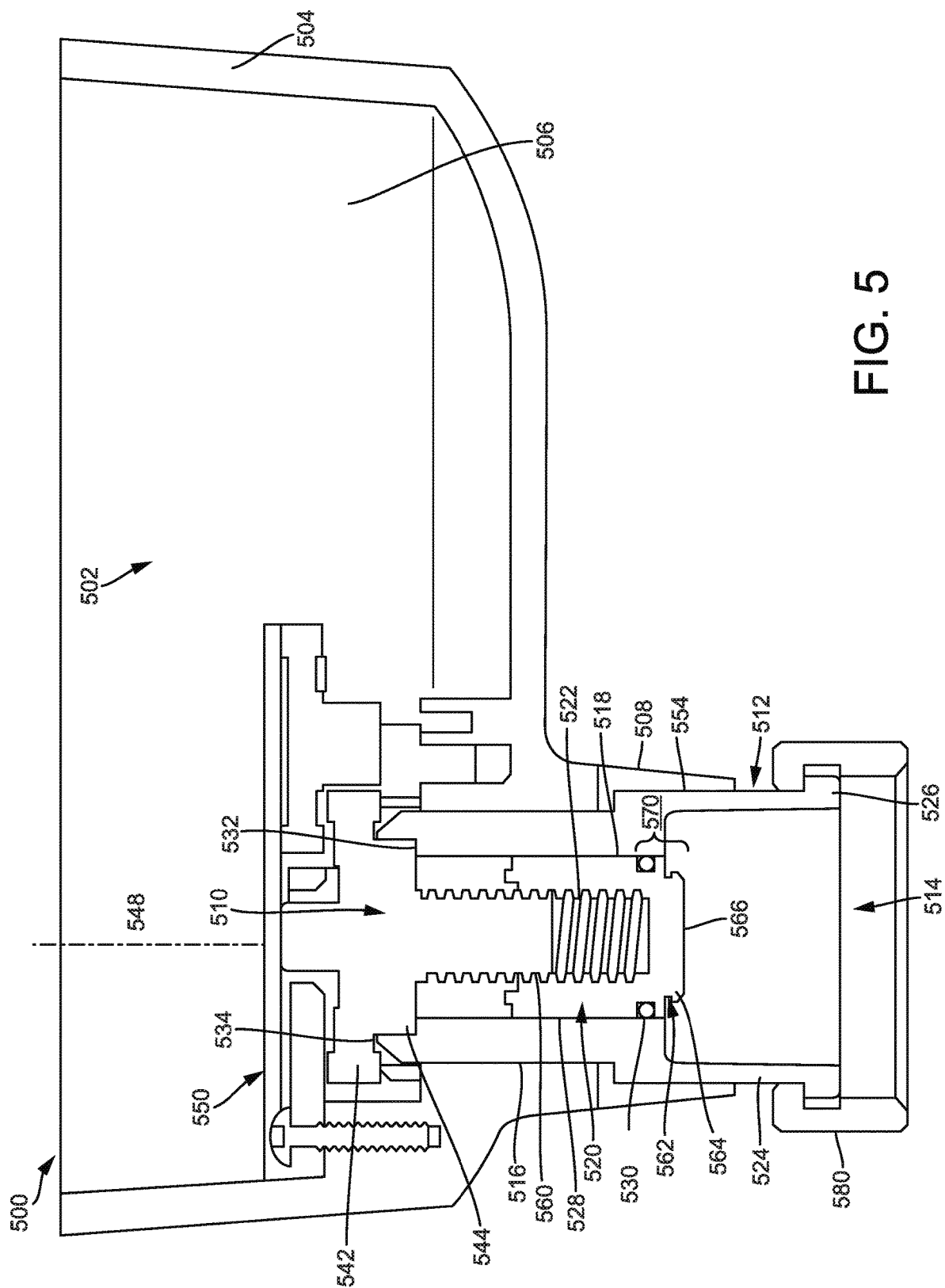
FIG. 5 is a cross-sectional view of an actuator with an output gear, an adaptor, and an interface nut, according to an exemplary embodiment.

Referring to FIG. 5, a cross-sectional view of an actuator 500 with an output gear 550 having a spindle 510 and nut 520 is shown, according to an exemplary embodiment. The actuator 500 includes a housing 502 that has an outer wall 504 and an interior volume 506. The interior volume 506 may contain any combination of control systems or circuit boards, electrical, hydraulic, pneumatic, or other power systems, gear trains or other mechanical components, or any other elements useful for the operation of actuator 500. A channel wall 508 extends from the outer wall 504 and may be substantially cylindrical with openings at an exterior end and an interior end. The channel wall 508 defines an output channel 514 that allows access to the interior volume 506 from outside the actuator 500. The channel wall 508 has an interior surface 516 that runs along the output channel 514. The channel wall 508 may have a uniform thickness or may taper towards the exterior end. The interior end may be aligned with the outer wall 504 or may be within the interior volume 506.

The interior volume 506 may contain any combination of control systems or circuit boards, electrical, hydraulic, pneumatic, or other power systems, gear trains or other mechanical components, or any other elements useful for the operation of actuator. In some embodiments, the interior volume contains a brushless direct current (BLDC) motor and a processing circuit configured to provide a pulse width modulated (PWM) DC output to control the speed of the BLDC motor. In other embodiments, the housing 502 may contain other types of motors that are controllable (e.g., by the various processing components of the actuator 500 and/or implemented systems).

The channel wall 508 may also include grooves or depressions into the interior surface 516 of the channel wall 508. The depressions may run circumferentially around the output channel 514 and have a roughly triangular cross-sectional shape. In other embodiments, the channel wall 508 may also include a step or steps. Each step is a change in the width of the channel wall 508 corresponding to an increase in size of the output channel 514.

The channel wall 508 may thereby be configured to receive an adaptor 512. The adaptor 512 includes a first adaptor wall 524 with an external surface 554 that substantially matches the interior surface 516 of the channel wall 508 and a second adaptor wall 528 that may be configured to receive the nut 520. In some embodiments, the adaptor 512 may be inserted and engaged with an internal portion of the channel wall 508. For example, the adaptor 512 may inserted and engaged (e.g., through press-fit, snap-fit, or slidingly engaged) with a snapping feature 544 of the spindle 510. It will be appreciated that the adaptor 512 may be configured such that the nut 520 may freely rotate and slide axially upward and downward along a threaded portion 522 of the spindle 510. A gasket 530 may be used to further seal and support the engagement of the adaptor 512 and the nut 520. In some embodiments, protrusions may protrude off of external surface 554 and run circumferentially around the first adaptor wall 524. The protrusions may be slightly deformable, such that the adaptor 512 may be inserted into the output channel 514 via the exterior end, sliding snuggly against the interior surface 516 until the protrusions reach a set of deformations or grooves. The protrusions or a similar engagement prevents the adaptor 512 from being removed from the output channel 514 via the exterior end.

The first adaptor wall 524 also includes one or more ledges as there is a transition to the second adaptor wall 528. A sudden change in the diameter of the adaptor 512 creates a ledge oriented orthogonal to the rest of the external surface 554. One or more ledges correspond to the step or steps in the channel wall 508. When the adaptor 512 is inserted into the output channel 514 the ledges are drawn flush against the steps. The ledges may engage the steps to prevent the adaptor 512 from entering into the interior volume 506 of the housing 502. The external surface 554 and ledges combine to fit snuggly against the interior surface 516 of the channel walls 508. This snug fit provides a water-tight seal that prevents water from entering the interior volume 506 of the housing 502.

The adaptor 512 also includes a collar 580 positioned at an output end 526 of the adaptor 512. The collar 580 may be configured to couple a mechanism such as a valve to the adaptor. For example, the collar 580 may include a threaded internal portion that may be configured to engage a threaded actuator engagement structure on a valve. When a mechanism is coupled to the adaptor 512, the spindle 510 may engage the mechanism, for example through a series of other transfer parts, to transfer a torque or force from the actuator to the mechanism. The actuator 500 can thereby actuate the mechanism as desired.

The adaptor 512 also includes a snapping structure 532 at an input end 534 of the adaptor 512. The snapping structure 532 may be configured to rotatably secure an output gear 550 to the adaptor 512. The output gear 550 (e.g., gear train) includes a spindle 510, a snapping feature 544, and a nut 520. The spindle 510 includes a cog 542 and a threaded portion 522 that may be configured to receive the nut 520. The cog 542, the snapping feature 544, and the spindle 510 may all have a substantially circular cross-sectional shape and may be configured to rotate around a central axis 548 aligned with the output channel 514. The cog 542 may engage with an actuator cog that can provide a force that causes a rotation of the cog 542, the snapping feature 544, and the threaded portion 522. The snapping feature 544 snaps into the snapping structure 532 to hold the output gear 550 to the adaptor 512 and position the spindle 510 within the output channel 514. The snapping feature 544 and the snapping structure 532 may be configured to allow the output gear 550 to freely rotate around the central axis 548 while preventing rotation about any other axis or translational motion of output gear 550 relative to the adaptor 512.

FIG. 5 further shows a nut 520 threadedly engaged with the threaded portion 522 of the spindle 510. The nut 520 includes an internal nut surface 560, the external nut surface 518, and an interface end 562. As previously discussed, the external nut surface 518 receives and is press-fit, snap-fit, or slidingly engaged against the adaptor 512. The internal nut surface 560 is a threaded surface as may be configured to threadedly engage the threaded surface 590 of the spindle 510 of the output gear 550. As will be appreciated, the nut 520 may be configured such that the rotation of the threaded portion 522 of the spindle 510 will cause the nut 520 to move axially up and down along the threaded portion 522 (e.g., up and down the second adaptor wall 528). By attaching the nut 520 to the threaded portion 522 of the spindle 510, the output gear 550 is able to actuate a valve at a greater distance 570. In other words, the addition of the nut 520 to the spindle 510 allows the output gear 550 to engage a valve body that has a closing dimension that is shorter by the distance 570.

The nut interface end 562 may be configured to receive a spacer. The spacer may vary in height (e.g., axial distance) and may be configured to increase the overall axial length of the nut 520, thereby increasing the "reach" of the output gear 550. In other words, a wide variety of spacers may be implemented onto the interface end 562 with heights that increase the length of the nut 520, thereby increasing the axial distance that the nut 520 can reach when moving axially downward along the second adaptor wall 528. Beneficially, the output gear 550, by way of the extended length of the nut 520, is able to engage a wide range of closing dimensions of a valve body. As shown in FIG. 5, the nut interface end 562 includes a mounting surface 566 and a connector 564 (e.g., cylindrical snapping structure) that receives a spacer having a snap structure (for example, as shown in FIGS. 8A-9C). The connector 564 may be configured to allow the output gear 550 to freely rotate around the central axis 548 while preventing rotation about any other axis or translational motion of output gear 550 or spacer relative to the adaptor 512. In some embodiments, the connector 564 may be a female (e.g., ring that receives a snapping structure) snap feature that receives a male (e.g., similar to the connector 564 of FIG. 5) snapping structure from the spacer. As shown in FIG. 5, the connector 564 includes two gap portions and a circular ridge portion to receive a complementary feature. The mounting surface 566 may be configured to provide additional support to sustain the actuator load. In some embodiments, the mounting surface 566 is flush with a central surface of the spacer. As is readily apparent the snap structure of the spacer is wider that than the connector 564 to allow for the snap structure to snap fit onto the connector 564.

Actuator Assembly Using a Spacer

Referring now to FIGS. 6A-6C, views of unassembled valves and complementary actuators are shown, according to exemplary embodiments. A portion of the actuator 500 of FIG. 5, specifically the output gear 550 and nut 520, and a complementary valve body 610 are shown in FIG. 6A. The valve body 610 includes a first end 612, a second end 614, and a valve stem 616. The first end 612 and the second end 614 are in fluid communication with each other and are the inlet and outlet of the valve body 610. The valve stem 616 may be configured to receive and engage the actuator 500. The valve stem 616 includes a knob 622, an actuator engagement structure 618, and a mounting surface 624. While the actuator engagement structure 618 is shown as a threaded member, the actuator engagement structure 618 may be any feature (e.g., snap fit, press-fit, snap-fit, or slidingly engaged, etc.) that engages the actuator 500 to connect the actuator 500 and the valve body 610. In some embodiments, the collar 580 of the adaptor 512 engages with the actuator engagement structure 618. The mounting surface 624 may be configured to engage with the output end 526 of the adaptor 512 to provide additional support to the engagement of the actuator 500 and valve body 610.

The knob 622 of the valve body 610 is securely positioned to be actuated by the actuator 500 by way of contact with the nut interface end 562. As is readily apparent, the valve body 610 is actuated (e.g., opened, closed, etc.) by the movement of the knob 622 protruding from the valve body 610. The movement may be linear (e.g., axial) movement, or in some arrangements, the movement may be rotational movement. The mounting surface 624 is positioned around the knob 622 and may be configured to be connected to actuator 500 to ensure that the knob 622 is in contact with the nut interface end 562 in a manner that allows the knob 622 to move axially downward when the nut 520 moves axially downward. As shown in FIG. 6A, the knob 622 has a closing dimension "X" 602, which corresponds to the distance from the end of the knob 622 to the mounting surface 624. As will be appreciated, the addition of the nut 520 to the spindle 510 of the actuator 500 allows for the nut 520 to contact the knob 622 when the valve body 610 is in the closed position. In other words, during operation of the actuator 500, the spindle 510 will rotate causing the nut 520 to move down in the axial direction and come into contact with the knob 622 when the knob 622 is in the closed position. As the nut 520 moves axially downward, the knob 622 is moved axially downward, opening the first end 612 and/or the second end 614 of the valve body 610. In some embodiments, the first end 612 and/or the second end 614 of the valve body 610 are closed when the knob 622 is extended in the axial direction and is opened as the nut 520 moves axially downward causing the knob 622 to move axially downward. Beneficially, the nut 520 may be altered (e.g., made to protrude longer with spacers or during manufacturing) to increase and decrease screw and shaft sizes to the desired stroke.

Referring to FIG. 6B, a portion of an actuator 600 and a complementary valve body 630 are shown. The actuator 600 is similar to the actuator 500 of FIG. 5. A difference between the actuator 500 and the actuator 600, is the actuator 600 includes a spacer 800 to reach a different closing dimension. Accordingly, features of the actuator 600 that are similar to features of the actuator 500 will have like numbering. The actuator 600 includes a spacer 800 that is snap fit onto the connector 564 of the nut interface end 562 of the nut 520. As is readily apparent, the addition of the spacer 800 extends the reach of the spindle 510 by a distance equal to the height 810 of the spacer 800, thereby allowing the actuator 600 to engage a knob 632 of the valve body 630. The spacer 800 is described in greater detail below with respect to FIGS. 8A-8C.

The valve body 630 is similar to the valve body 610 of FIG. 6A. A difference between the valve body 610 and the valve body 630, is the valve body 630 has a different closing dimension. Accordingly, features of the valve body 630 that are similar to features of the valve body 610 will have like numbering. The valve body 630 includes a first end 612, a second end 614, and a valve stem 626. The first end 612 and the second end 614 are in fluid communication with each other and are the inlet and outlet of the valve body 630. The valve stem 626 may be configured to receive and engage the actuator 600. The valve stem 626 includes a knob 632, an actuator engagement structure 618, and a mounting surface 624. While the actuator engagement structure 618 is shown as a threaded member, the actuator engagement structure 618 may be any feature (e.g., snap fit, press-fit, snap-fit, or slidingly engaged, etc.) that engages the actuator 600 to connect the actuator 600 and the valve body 630. In some embodiments, the collar 580 of the adaptor 512 engages with the actuator engagement structure 618. The mounting surface 624 may be configured to engage with the output end 526 of the adaptor 512 to provide additional support to the engagement of the actuator 600 and valve body 630.

The knob 632 of the valve body 630 is securely positioned to engage with the actuator 600 by way of contact with the spacer 800. As is readily apparent, the valve body 630 is actuated (e.g., opened, closed, etc.) by the movement of the knob 632 protruding from the valve body 630. The movement may be linear (e.g., axial) movement, or in some arrangements, the movement may be rotational movement. The mounting surface 624 is positioned around the knob 632 and may be configured to be connected to actuator 600 to ensure that the knob 632 is in contact with the spacer 800 in a manner that allows the knob 632 to move axially downward when the nut 520 moves axially downward. As shown in FIG. 6B, the knob 632 has a closing dimension "Y" 604, which corresponds to the distance from the end of the knob 632 to the mounting surface 624. As will be appreciated, the addition of the spacer 800 to the nut 520 allows for the nut 520 to contact the knob 632 when the valve body 630 is in the closed position. In other words, during operation of the actuator 600, the spindle 510 will rotate causing the nut 520 to move down in the axial direction and cause the spacer 800 to come into contact with the knob 632 when the knob 632 is in the closed position. As the nut 520 moves axially downward, the knob 632 is moved axially downward by the spacer 800, thus opening the first end 612 and/or the second end 614 of the valve body 630. In some embodiments, the first end 612 and/or the second end 614 of the valve body 630 are closed when the knob 632 is extended in the axial direction and is opened as the nut 520 and spacer 800 move axially downward causing the knob 632 to move axially downward. Beneficially, the nut 520 may be altered (e.g., made to protrude longer with spacers or during manufacturing) to increase and decrease screw and shaft sizes to the desired stroke.

Referring to FIG. 6C, a portion of an actuator 620 and a complementary valve body 650 are shown. The actuator 620 is similar to the actuator 500 of FIG. 5. A difference between the actuator 500 and the actuator 620, is the actuator 620 includes a spacer 900 to reach a different closing dimension. Accordingly, features of the actuator 620 that are similar to features of the actuator 500 will have like numbering. As shown in FIG. 6C, the actuator 620 includes a spacer 900 that may be snap fit onto the connector 564 of the nut 520. As is readily apparent, the addition of the spacer 900 extends the reach of the spindle 510 by a distance equal to the height 910 of the spacer 900, thereby allowing the actuator 620 to engage a knob 652 of the valve body 630. The spacer 900 is described in greater detail below with respect to FIGS. 9A-9C.

The valve body 650 is similar to the valve body 610 of FIG. 6A. A difference between the valve body 650 and the valve body 610, is the valve body 650 has a different closing dimension. Accordingly, features of the valve body 650 that are similar to features of the valve body 610 will have like numbering. The valve body 650 includes a first end 612, a second end 614, and a valve stem 636. The first end 612 and the second end 614 are in fluid communication with each other and are the inlet and outlet of the valve body 650. The valve stem 636 may be configured to receive and engage the actuator 620. The valve stem 636 includes a knob 652, an actuator engagement structure 618, and a mounting surface 624. While the actuator engagement structure 618 is shown as a threaded member, the actuator engagement structure 618 may be any feature (e.g., snap fit, press-fit, snap-fit, or slidingly engaged, etc.) that engages the actuator 620 to connect the actuator 620 and the valve body 630. In some embodiments, the collar 580 of the adaptor 512 engages with the actuator engagement structure 618. The mounting surface 624 may be configured to engage with the output end 526 of the adaptor 512 to provide additional support to the engagement of the actuator 620 and valve body 630.

The knob 652 of the valve body 650 is securely positioned to engage with the actuator 620 by way of contact with the spacer 900. As is readily apparent, the valve body 650 is actuated (e.g., opened, closed, etc.) by the movement of the knob 652 protruding from the valve body 650. The movement may be linear (e.g., axial) movement, or in some arrangements, the movement may be rotational movement. The mounting surface 624 is positioned around the knob 652 and may be configured to be connected to actuator 620 to ensure that the knob 652 is in contact with the spacer 900 in a manner that allows the knob 652 to move axially downward when the nut 520 moves axially downward. As shown in FIG. 6C, the knob 652 has a closing dimension "Z" 606, which corresponds to the distance from the end of the knob 652 to the mounting surface 624. As will be appreciated, the addition of the spacer 900 to the nut 520 allows for the nut 520 to contact the knob 652 when the valve body 650 is in the closed position. In other words, during operation of the actuator 620, the spindle 510 will rotate causing the nut 520 to move down in the axial direction and cause the spacer 900 to come into contact with the knob 652 when the knob 652 is in the closed position. As the nut 520 moves axially downward, the knob 652 is moved axially downward by the spacer 900, thus opening the first end 612 and/or the second end 614 of the valve body 650. In some embodiments, the first end 612 and/or the second end 614 of the valve body 650 are closed when the knob 652 is extended in the axial direction and is opened as the nut 520 and spacer 900 move axially downward causing the knob 652 to move axially downward. Beneficially, the nut 520 may be altered (e.g., made to protrude longer with spacers or during manufacturing) to increase and decrease screw and shaft sizes to the desired stroke.

Figure 7C:
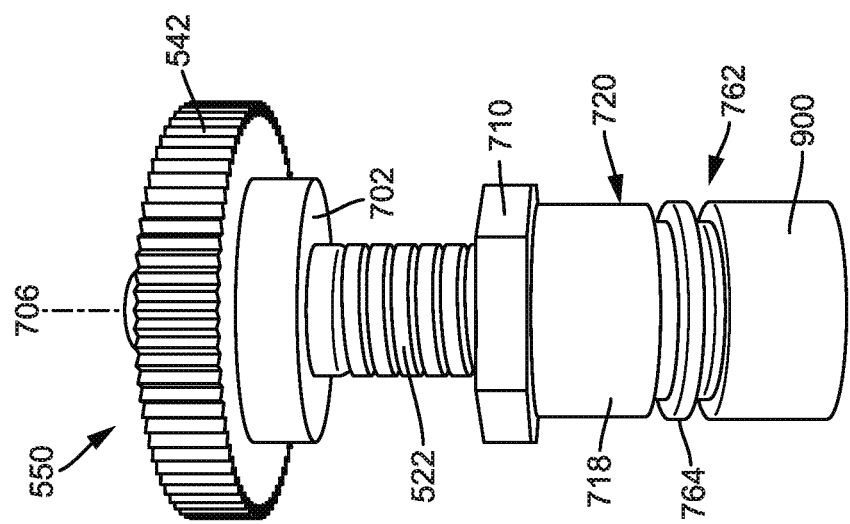
FIG. 7C is a perspective view of the output gear and interface nut, and spacer of FIG. 6C, according to an exemplary embodiment.
Figure 7B:
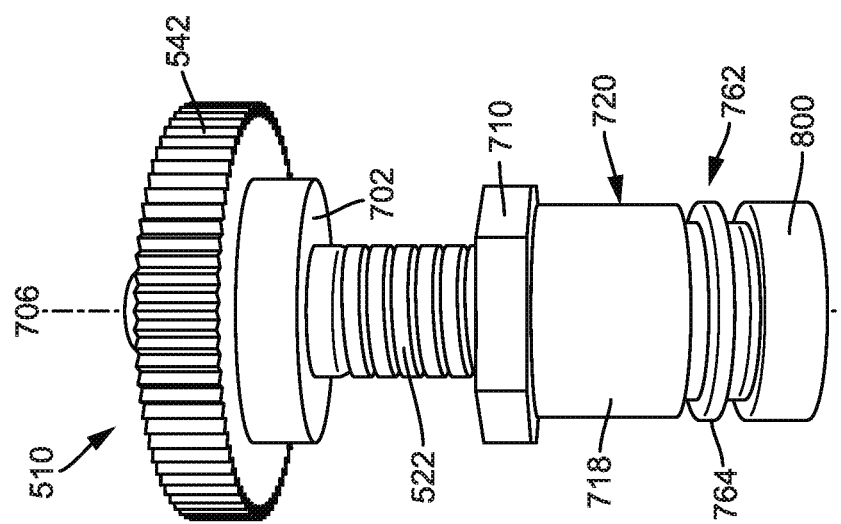
FIG. 7B is a perspective view of the output gear, interface nut, and spacer of FIG. 6B, according to an exemplary embodiment.
Figure 7A:
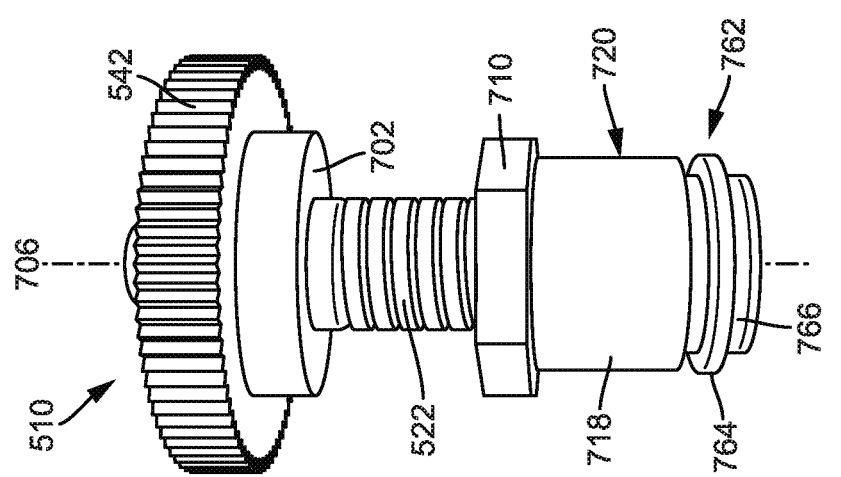
FIG. 7A is a perspective view of the output gear and interface nut of FIG. 6A, according to an exemplary embodiment.

Referring to FIGS. 7A-7C, perspective views of the spindle 510 of the actuator of FIGS. 5-6C, respectively, are shown. The spindle 510 includes the cog 542, a middle portion 702, and the threaded portion 522. The spindle 510 of FIGS. 7A-7C is shown threadidly connected to a nut portion 720. The nut portion 720 is similar to the nut portion 520 of FIGS. 5-6C. A difference between the nut portion 720 and the nut portion 520, is the nut portion 720 includes a ribbed portion 710 and a nut interface end 762 that includes a mounting surface 766 and a connector 764. Accordingly, features of the nut portion 720 that are similar to features of the nut portion 520 will have like numbering. The nut 720 is substantially cylindrical and includes a threaded core and an external nut surface 718, one or more ribs 710, and the interface end 762. The threaded core may be configured to engage the spindle 510 to connect the nut 720 to the spindle 510. The one or more ribs 710 protrude off the external nut surface 718 and are configured to interact an adaptor wall, for example second the adaptor wall 528, to facilitate the axial movement of the nut 720. The connector 764 extends radially outward from the central axis 706 and is configured to engage a spacer (e.g., spacer 800 or spacer 900). The mounting surface 766 is configured to come in contact with, and axially move, a knob of a valve body. As shown in FIGS. 7B and 7C, a spacer 800 and a spacer 900 are attached to the connector 764 of the nut 720, respectively.

Figure 8A:
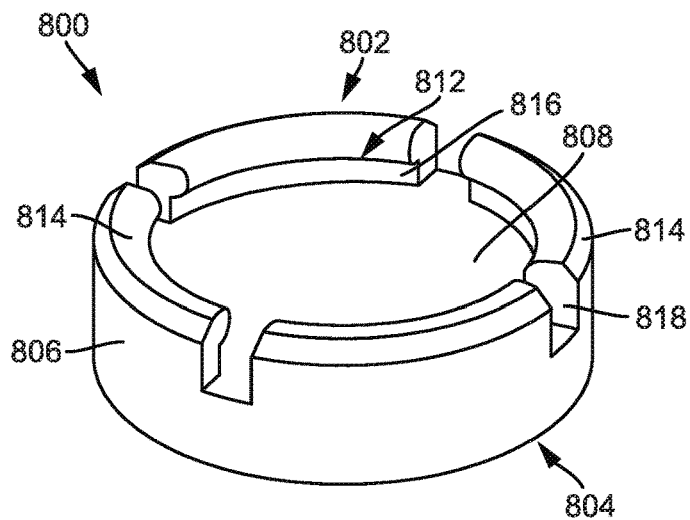
FIG. 8A is a perspective view of the spacer of FIG. 7B used to engage the valve body and the actuator, according to an exemplary embodiment.
Figure 8B:
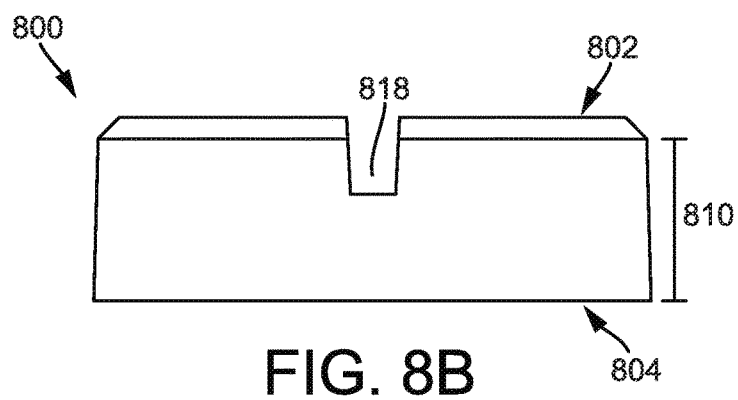
FIG. 8B is a side view of the spacer of FIG. 7B used to engage the valve body and the actuator, according to an exemplary embodiment.

FIGS. 8A and 8B show a spacer 800 that can be connected to the nut 520 or nut 720 and is configured to come into contact with a knob, for example the knob 632 of FIG. 6B, and move the knob axially downward. The spacer 800 snap-fits around the connector 564 on the nut interface end 562 of the nut 520. In some embodiments, the spacer 800 may be configured to snap fit within the connector 564, such that the mounting surface 808 and/or nut end 802 includes a male snap structure that may be configured to snap fit into a female snap structure. In other words, the snap structure of the nut 520 and the spacer 800, as shown in FIGS. 5-8A, may be swapped. The spacer 800 is cylindrically shaped and has a diameter substantially similar to the diameter of the nut 520.

The spacer 800 includes a nut end 802, a valve end 804, and an exterior surface 806 extending axially between the valve end 804 and the nut end 802. The nut end 802 may be configured to snap fit with the nut 520 and the valve end 804. The spacer 800 has a height 810 that is tailored to ensure that the valve end 804 of the spacer 800 is adjacent to, and in contact with, the knob 632 of the valve body 630. The valve end 804 may be configured to sustain the actuator load and is able to engage a specific stem stroke of the valve body 630. The nut end 802 includes a mounting surface 808 and a plurality of flexible ribs 814 that extend from the mounting surface 808 away from the valve end 804. In some embodiments, the valve end 804 is configured to receive an additional spacer to increase the axial length of the nut 520. For example, the valve end 804 may be configured to be similar in shape and structure of the connector 564 such that a spacer 800 or spacer 900 may be added to the valve end 804, the plurality of ribs of the additional spacer engaging the connector of the valve end 804. In some embodiments, the connector is disposed along the side (e.g., exterior surface 806) of the spacer 800 adjacent to the valve end 804. The mounting surface 808 may be configured to contact or be adjacent to the mounting surface 566 of the nut 520. In some embodiments the mounting surface 808 is solid, extending from the base of the plurality of ribs 814 to the valve end 804. In other embodiments, the mounting surface 808 is hollow, such that a gap is disposed between the mounting surface 808 and the valve end 804.

The plurality of ribs 814 are flexible members that are radially movable to receive and contain the connector 564 portion of the nut 520. Each rib in the plurality of ribs 814 include a snap channel 816 that extends from the mounting surface 808 and a snap structure 812 that extends radially inward. The snap structure 812 and snap channel 816 are configured to be complementary to the shape of the connector 564 to ensure that the spacer 800 can be easily snap fit onto the nut 520, staying connected to the nut 520 until removed by a user (e.g., operator) or a machine (e.g., a device controlled by the operator). A rib gap 818 is disposed between each rib in the plurality of ribs 814. While four ribs are shown in the plurality of ribs 814, a single flexible rib or multiple flexible ribs may be implemented on the nut end 802 of the spacer 800 to engage with the nut 520 of the actuator 600. When the spacer 800 is inserted onto the nut 520, the plurality of ribs 814 will move radially outward until the ridge of the connector 564 is in contact with the snap channel 816 of each respective rib in the plurality of ribs. Once the connector 564 is adjacent to the snap channel 816 (e.g., the connector 564 is past the snap structure 812) the plurality of ribs 814 move radially inward until the connector is snap fit within the spacer 800 (e.g., the snap structure 812 is above and contains the connector 564).

Figure 8C:
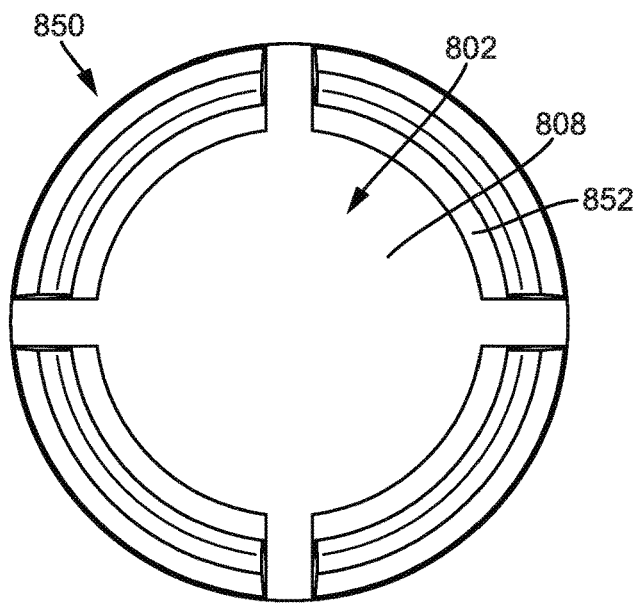
FIG. 8C is a top plan view of a spacer used to engage the valve body and the actuator, according to an exemplary embodiment.

Referring to FIG. 8C, a top plan view of a spacer 850 used to engage the valve body and the actuator is shown, according to an example embodiment. The spacer 850 is similar to the spacer 800 of FIGS. 8A & 8B. A difference between the spacer 800 and the spacer 850, is a mounting surface gap 852 in the spacer 850. Accordingly, features of the spacer 850 that are similar to features of the spacer 800 will have like numbering. The spacer 850 has a mounting surface gap 852 disposed between each rib in the plurality of ribs 814 and the mounting surface 808. The mounting surface gap 852 provides additionally flexibility and functionality when the spacer 850 is inserted over the connector 564 and is disposed on the nut 520.

Figure 9A:
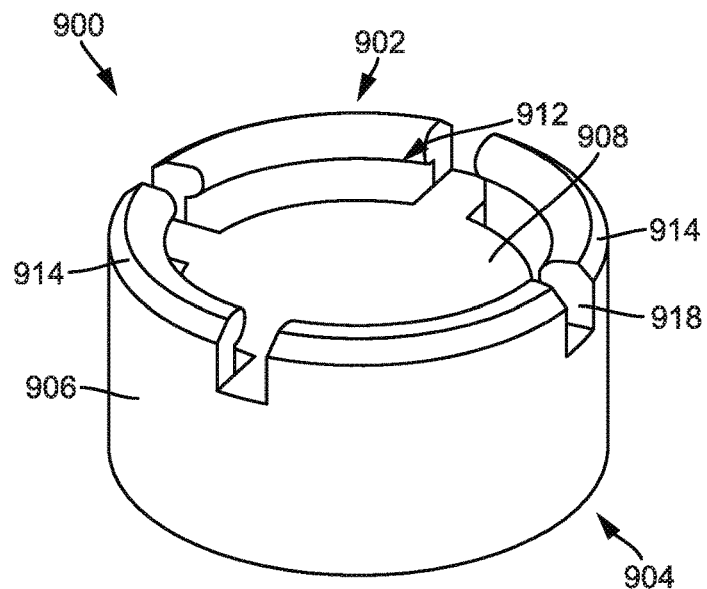
FIG. 9A is a perspective view of the spacer of FIG. 7C used to engage the valve body and the actuator, according to an exemplary embodiment.
Figure 9B:
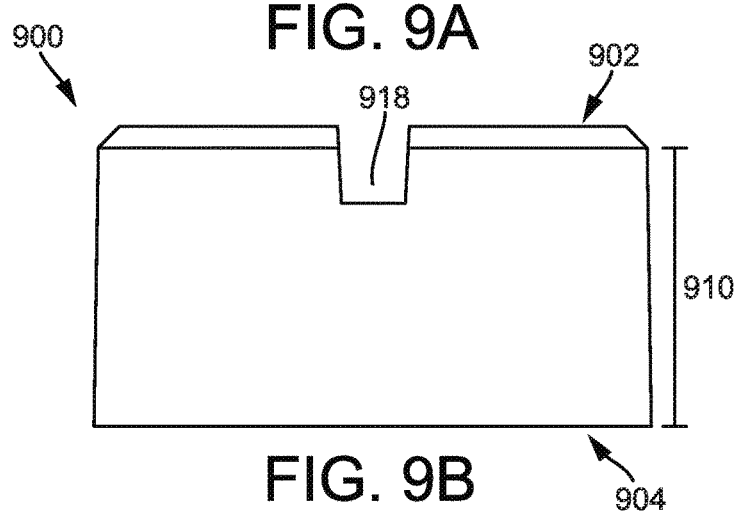
FIG. 9B is a side view of the spacer of FIG. 7C used to engage the valve body and the actuator, according to an exemplary embodiment.

FIGS. 9A and 9B show a spacer 900 that can be connected to the nut 520 or nut 720 and is configured to come into contact with a knob, for example the knob 652 of FIG. 6C, and move the knob axially downward. The spacer 900 snap-fits around the connector 564 on the nut interface end 562 of the nut 520. In some embodiments, the spacer 900 may be configured to snap fit within the connector 564, such that the mounting surface 908 and/or nut end 902 includes a male snap structure that may be configured to snap fit into a female snap structure. In other words, the snap structure of the nut 520 and the spacer 900, as shown in FIGS. 5 and 9A, may be swapped. The spacer 900 is cylindrically shaped and has a diameter substantially similar to the diameter of the nut 520.

The spacer 900 includes a nut end 902, a valve end 904, and an exterior surface 906 extending axially between the valve end 904 and the nut end 902. The nut end 902 may be configured to snap fit with the nut 520 and the valve end 904. The spacer 900 has a height 910 that is tailored to ensure that the valve end 904 of the spacer 900 is adjacent to, and in contact with, the knob 652 of the valve body 650. The valve end 904 may be configured to sustain the actuator load and is able to engage a specific stem stroke of the valve body 650. In some embodiments, the valve end 904 is configured to receive an additional spacer to increase the axial length of the nut 520. For example, the valve end 904 may be configured to be similar in shape and structure of the connector 564 such that a spacer 800 or spacer 900 may be added to the valve end 904, the plurality of ribs of the additional spacer engaging the connector of the valve end 904. In some embodiments, the connector is disposed along the side (e.g., exterior surface 906) of the spacer 900 adjacent to the valve end 904. The nut end 902 includes a mounting surface 908 and a plurality of flexible ribs 914 that extend from the mounting surface 908 away from the valve end 904. The mounting surface 908 may be configured to contact or be adjacent to the mounting surface 566 of the nut 520. In some embodiments the mounting surface 908 is solid, extending from the base of the plurality of ribs 914 to the valve end 904. In other embodiments, the mounting surface 908 is hollow, such that a gap is disposed between the mounting surface 908 and the valve end 904.

The plurality of ribs 914 are flexible members that are radially movable to receive and contain the connector 564 portion of the nut 520. Each rib in the plurality of ribs 914 include a snap channel 916 that extends from the mounting surface 908 and a snap structure 912 that extends radially inward. The snap structure 912 and snap channel 916 are configured to be complementary to the shape of the connector 564 to ensure that the spacer 900 can be easily snap fit onto the nut 520, staying connected to the nut 520 until removed by a user (e.g., operator) or a machine (e.g., a device controlled by the operator). A rib gap 918 is disposed between each rib in the plurality of ribs 914. While four ribs are shown in the plurality of ribs 914, a single flexible rib or multiple flexible ribs may be implemented on the nut end 902 of the spacer 900 to engage with the nut 520 of the actuator 600. When the spacer 900 is inserted onto the nut 520, the plurality of ribs 914 will move radially outward until the ridge of the connector 564 is in contact with the snap channel 916 of each respective rib in the plurality of ribs. Once the connector 564 is adjacent to the snap channel 916 (e.g., the connector 564 is past the snap structure 912) the plurality of ribs 914 move radially inward until the connector is snap fit within the spacer 900 (e.g., the snap structure 912 is above and contains the connector 564).

Figure 9C:
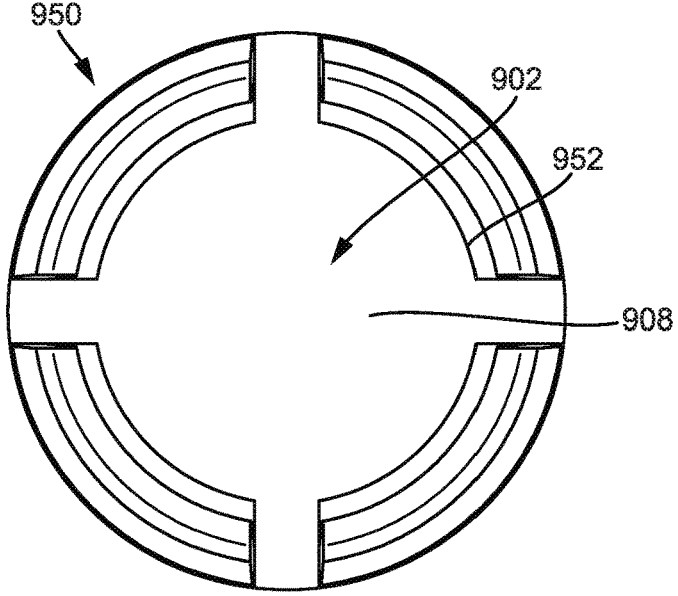
FIG. 9C is a top plan view of a spacer used to engage the valve body and the actuator, according to an exemplary embodiment.

Referring to FIG. 9C, a top plan view of a spacer 950 used to engage the valve body and the actuator is shown, according to an example embodiment. The spacer 950 is similar to the spacer 900 of FIGS. 9A & 9B. A difference between the spacer 900 and the spacer 950, is a mounting surface gap 952 in the spacer 950. Accordingly, features of the spacer 950 that are similar to features of the spacer 900 will have like numbering. The spacer 950 has a mounting surface gap 952 disposed between each rib in the plurality of ribs 914 and the mounting surface 908. The mounting surface gap 952 provides additionally flexibility and functionality when the spacer 950 is inserted over the connector 564 and is disposed on the nut 520.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the HVAC actuator and assembly thereof as shown in the various exemplary embodiments is illustrative only. Additionally, any element disclosed in one embodiment may be incorporated or utilized with any other embodiment disclosed herein. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. An actuator comprising:
    a housing;
    an output gear disposed within the housing;
    a spindle connected to the output gear;
    an output nut connected to the spindle, the spindle being rotatable within the output nut to enable linear motion of the output nut, and the output nut comprising a connector; and
    a first spacer configured to be coupled to the connector of the output nut such that the first spacer has a first height from a bottom surface of the output nut when the first spacer is coupled to the connector of the output nut; and
    a second spacer configured to be coupled to the connector of the output nut such that the second spacer has a second height from the bottom surface of the output nut when the second spacer is coupled to the connector of the output nut, the second height different from the first height;
    wherein at least one of the first spacer or the second spacer is selectively coupled to the connector of the output nut.

2. The actuator of claim 1, wherein the connector includes a radially projecting connection surface and the first spacer comprises a first end and a second end, the first end comprising a plurality of flexible ribs extending away from the second end of the first spacer, the plurality of flexible ribs configured to engage the radially projecting connection surface.

3. The actuator of claim 2, wherein the plurality of flexible ribs are radially movable to snap fit with the radially projecting connection surface of the connector.

4. The actuator of claim 2, wherein each rib in the plurality of flexible ribs comprises a snap channel and a snap portion, the snap channel extending from the first end of the first spacer axially away from the second end of the first spacer, the snap portion extending radially inward from an end of the snap channel.

5. The actuator of claim 2, wherein the second end of the first spacer comprises a spacer connector, the spacer connector configured to receive the second spacer, the second spacer comprising a second plurality of flexible ribs configured to engage the spacer connector.

6. The actuator of claim 1, wherein the first spacer comprises a first end and a second end, the first end comprising a plurality of flexible ribs extending away from the second end of the first spacer, the plurality of flexible ribs disposed around a circumference of the first end to form a mounting surface.

7. The actuator of claim 6, wherein a surface gap is disposed between each flexible rib in the plurality of flexible ribs and the mounting surface.

8. The actuator of claim 6, wherein a rib gap is disposed between each flexible rib in the plurality of flexible ribs and an adjacent flexible rib in the plurality of flexible ribs.

9. The actuator of claim 1, further comprising a valve, the actuator mounted on the valve, wherein the at least one of the first spacer or the second spacer is in contact with a valve stem of the valve.

10. The actuator of claim 9, wherein the linear motion of the output nut downward causes the at least one of the first spacer or the second spacer to move axially downward and contact the valve stem and move the valve stem linearly downward.

11. The actuator of claim 1, further comprising a gear train, a motor, and circuit board, the motor operably connected to and controlled by the circuit board, and the gear train operably connected to the motor, the gear train operably connected to the output gear.

12. The actuator of claim 1, further comprising an adaptor rotatably secured to the output gear, the adaptor defining an adaptor opening and comprising a first portion;
wherein the housing defines a channel wall opening;
wherein the first portion is disposed within the channel wall opening;
wherein the spindle comprises a second portion that is disposed within the adaptor opening; and
wherein the output nut comprises a third portion that is disposed within the adaptor opening.

13. An actuator comprising:
a housing defining comprising:
an internal volume and a channel wall opening;
an output gear disposed within the internal volume;
a nut disposed within the channel wall opening;
a spindle at least partially disposed within the channel wall opening, threadably coupled to the nut, rotatable relative to the nut such that rotation of the spindle relative to the nut causes linear translation of the nut relative to the spindle, and rotatably coupled to the output gear such that rotation of the output gear relative to the housing causes rotation of the spindle relative to the housing;
a first spacer configured to be coupled to the nut such that the first spacer has a first height from a bottom surface of the nut when the first spacer is coupled to the nut; and
a second spacer configured to be coupled to the nut such that the second spacer has a second height from the bottom surface of the nut when the second spacer is coupled to the nut, the second height different from the first height;
wherein at least one of the first spacer or the second spacer is selectively coupled to the nut.

14. The actuator of claim 13, wherein:
the housing comprises:
an outer wall that at least partially defines the internal volume; and
a channel wall extending from the outer wall, the channel wall being substantially cylindrical, defining the channel wall opening, and comprising:
an interior end at least partially projecting into the internal volume; and
an exterior end opposite the interior end; and the channel wall is contiguous with the outer wall at a location between the interior end and the exterior end.

15. The actuator of claim 14, further comprising an adaptor comprising:
a first adaptor wall that is received within the channel wall and disposed proximate the exterior end; and
a second adaptor wall that is received within the channel wall and receives the nut and configured to cooperate with the nut to establish a fluid tight seal between the second adaptor wall and the nut.

16. The actuator of claim 15, wherein:
the at least one of the first spacer or the second spacer is disposed within the first adaptor wall; and
the nut comprises a connector that is rotatably coupled to the at least one of the first spacer or the second spacer such that rotation of the nut relative to the channel wall causes rotation of the at least one of the first spacer or the second spacer relative to the channel wall.

17. The actuator of claim 15, wherein the adaptor further comprises a snapping structure that is rotatably coupled to the output gear such that rotation of the output gear relative to the channel wall causes rotation of the adaptor relative to the channel wall.

18. The actuator of claim 13, further comprising a motor disposed within the internal volume, operatively coupled to the output gear, and configured to selectively cause rotation of the output gear.

19. The actuator of claim 18, further comprising a processing circuit disposed within the internal volume, communicable with the motor, and configured to facilitate selective rotation of the output gear.

20. An actuator comprising:
a housing defining:
an internal volume and a channel wall opening;
an output gear disposed within the internal volume;
a nut disposed within the channel wall opening;
an adaptor comprising:
a first adaptor wall that is received within the channel wall opening;
a second adaptor wall that is received within the channel wall opening and receives the nut and is configured to cooperate with the nut to establish a fluid tight seal between the second adaptor wall and the nut; and
a snapping structure that is rotatably coupled to the output gear such that rotation of the output gear relative to the housing causes rotation of the adaptor relative to the housing; and
a first spacer configured to be coupled to the nut such that the first spacer has a first height from a bottom surface of the nut when the first spacer is coupled to the nut; and
a second spacer configured to be coupled to the nut such that the second spacer has a second height from the bottom surface of the nut when the second spacer is coupled to the nut, the second height different from the first height;
wherein at least one of the first spacer or the second spacer is selectively coupled to the nut.

21. The actuator of claim 20, wherein:
the at least one of the first spacer or the second spacer is disposed within the first adaptor wall; and
the nut comprises a connector that is rotatably coupled to the at least one of the first spacer or the second spacer such that rotation of the nut relative to the housing causes rotation of the at least one of the first spacer or the second spacer relative to the housing.

\* \* \* \* \*